ALI MARANDI
INVENTOR.

BY *Lyon & Lyon*
ATTORNEYS

United States Patent Office 3,439,895
Patented Apr. 22, 1969

3,439,895
PILOT OPERATED VALVE
Ali Marandi, Azusa, Calif., assignor to Clemar Manufacturing Corporation, Glendora, Calif., a corporation of California
Filed May 1, 1967, Ser. No. 635,065
Int. Cl. F16k *31/145, 31/06*
U.S. Cl. 251—30                                6 Claims

ABSTRACT OF THE DISCLOSURE

A diaphragm valve having a contiguous solenoid operated pilot valve, and passage communicating between the pilot valve and with the upstream side of the valve, the bonnet cavity and the downstream side of the valve. The passage between the pilot valve and the bonnet is for flow in one direction to open the valve and in the opposite direction to close the valve, and the passage having means for restricting flow in either direction to effect slow opening and closing.

Background of the invention

It is common practice to provide a pilot operated valve of the piston or diaphragm type in which a restricted passage is provided between the upstream side of the valve and the valve bonnet. However, this arrangement provides for only slow closing of the valve. Also, the location of this passage is such that in order to clean the passage, should it become clogged, the entire valve must be disassembled.

The purposes of this invention are expressed in the following objects:

First, to provide a pilot operated valve in which the control liquid is supplied to the valve bonnet or drained therefrom through a single passageway having means which restricts flow in either direction so as to effect slow opening as well as slow closing of the valve.

Second, to provide a pilot operated valve of this type wherein, by reason of the back-and-forth flow through the bonnet control passageway, the passageway tends to be self-purging.

Third, to provide a pilot operated valve of this type in which access to the bonnet control passageway and the other passages controlled by the pilot valve are accessible by removal of the solenoid without requiring disassembly of the main valve.

Fourth, to provide a pilot operated valve which is particularly suited for the incorporation of a fluid resistor having labrinth passages the extent of which may be changed to increase the effective resistance to flow in order to meet different operating conditions.

Figure 1:
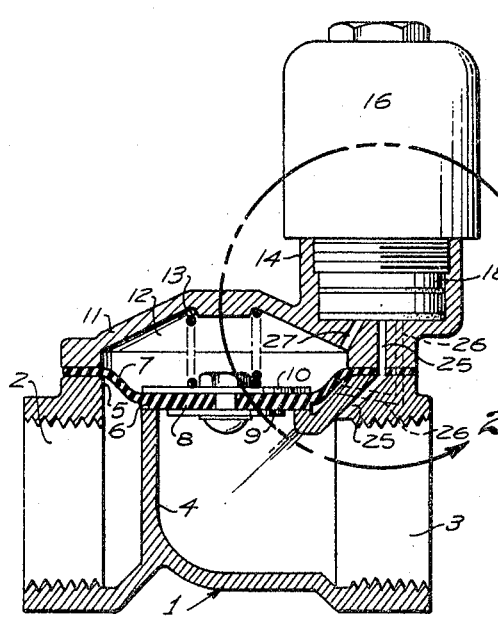
FIGURE 1 is a sectional view through the pilot operated valve, showing the main valve in its closed position.

The pilot operated valve includes a main valve body 1, having a coaxial inlet 2 and outlet 3 separated by a partition 4. The valve body is provided with a recess 5 at one lateral side, which communicates with both the inlet and the outlet. A valve seat 6, communicating with the outlet, confronts the lateral recess 5.

The recess 5 is covered by a diaphragm 7, the central portion of which forms a valve element 8, engageable with the valve seat 6, and having stiffening washers 9 and 10 on opposite sides.

The diaphragm 7 is covered by a diaphragm bonnet 11, which forms with the diaphragm a bonnet chamber 12. A spring 13, in the bonnet chamber 12, urges the valve element 8 against the valve seat 6.

While a diaphragm type valve is shown, it should be noted that a piston type valve may be used, slidable in a piston chamber.

At one side of the diaphragm bonnet 11, there is formed a pilot valve mounting boss 14, having a cylindrical recess 15 therein, screwthreaded at its upper end to receive a solenoid unit 16, having an armature 17 therein.

Mounted within the recess 15 is a valve seat disk 18, having a central raised seat 19, confronting the armature 17. The inner end of the armature 17 forms a valve face 20, which engages the seat 19. The disk 18 and the confronting end of the solenoid unit define a pilot valve chamber 21.

Interposed between the valve seat disk 18 and the bottom of the recess 15, is a flow resistance unit 22 in the form of a disk, and washers 23 and 24, which form seals between the flow resistance unit, the valve seat disk 18 and the bottom of the recess 15.

A bleed passage 25 communicates between the pilot valve seat 19 and a point downstream from the main valve seat 6. A supply passage 26 communicates between the pilot valve chamber 21 and a point upstream from the main valve seat 6. This passage also extends through the valve seat disk 18 and the flow resistance unit 22. A surge passage 27 communicates between the pilot valve chamber 21 and the bonnet chamber 12.

The bleed passage 25 and supply passage 26 include through ports traversing the flow resistance unit 22, whereas the surge passage 27 includes a labrinth passage within the flow resistance unit 22. More particularly, the labrinth passage includes a serpentine channel 28 formed in each side of the flow resistance unit connected by a port 29 at one extremity and connected to the surge passage at their remote extremities, thereby forming a single continuous path.

Located periodically at one side of each serpentine channel 28 is a set of U-shaped loop channels 30, the extremities of one set of loop channels face against the direction of flow from the pilot valve chamber 21 to the bonnet chamber 12; whereas, the extremities of the other set of loops face against the direction of flow from the bonnet chamber 12 to the pilot valve chamber 21.

A portion of the water enters one upstream facing end of a loop channel 30 and discharges from the other upstream facing end at 31 and interferes with the flow of water in the channel 28 producing a resistance to flow. The resistance means employed in the flow resistance unit is a modification of a device invented by Tesla which is known as a "Tesla Diode."

In the construction illustrated, the flow resistance unit 22 comprises a single disk. If greater resistance is needed, two or more of these disks may be stacked.

Figure 2:
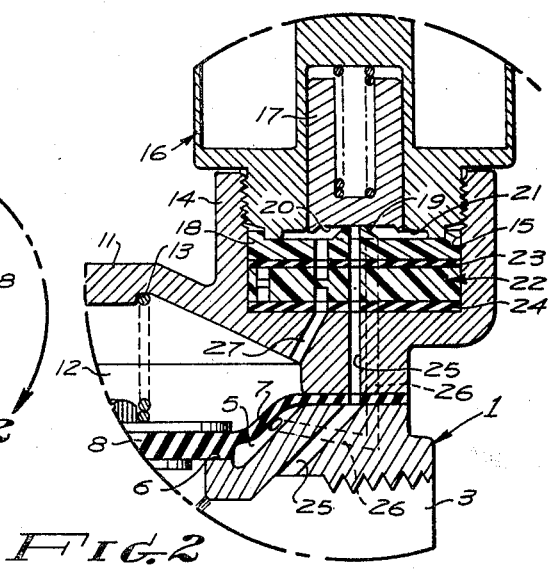
FIGURE 2 is an enlarged fragmentary sectional view taken within circle 2 of FIGURE 1, showing the main valve and the pilot valve in their closed positions.
Figure 3:
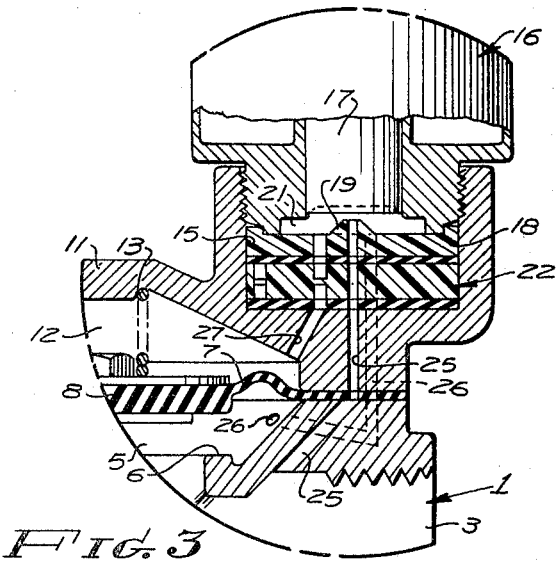
FIGURE 3 is a similar enlarged fragmentary view, showing the main valve and the pilot valve in their open positions.
Figure 4:
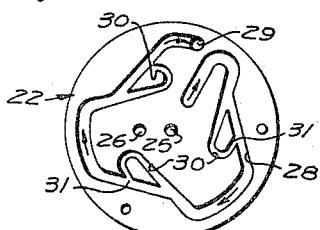
FIGURE 4 is a plan view of the pilot valve seat disk.
Figure 5:
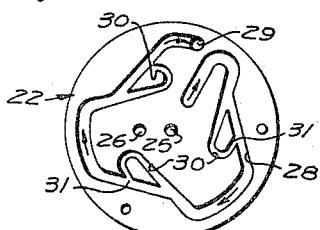
FIGURE 5 is a plan view of the flow resistance unit.
Figures 6, 7:
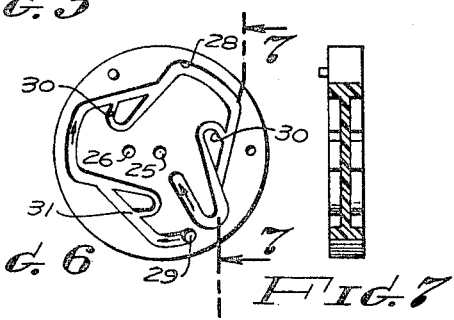
FIGURE 6 is a bottom view thereof.
FIGURE 7 is a sectional view thereof, taken through 7—7 of FIGURE 6.

Operation of the pilot operated valve is as follows:

When the pilot valve is closed, as shown in FIGURE 2, fluid upstream from the main valve seat 6, enters the pilot valve chamber 21 through the supply passage 26 and flows into the bonnet chamber 12 through the surge passage 27. The rate of flow is determined by the flow resistance unit 22. Thus, after a predetermined interval of time, the fluid pressure behind the diaphragm 7 causes the main valve to close.

When the pilot valve is open, fluid may bleed from the pilot valve chamber 21 to a point downstream from the main valve seat 6, reducing the pressure in the pilot valve chamber 21 so that reverse flow occurs through the surge passage 27. The reverse flow is again determined by the resistance afforded by the unit 22. In this regard, it should be noted that the effective area of the bleed passage 25 is larger than the effective area of the inlet passage 26. Or, stated otherwise, the resistance to flow in the bleed passage is less than the resistance to flow through the surge passage.

It should be noted that the opening movement need not be dependent on the resistance of the surge passage; that is, if the bleed passage 25 is made only slightly larger than the inlet passage 26, most of the water discharging through the bleed passage 25 is supplied from the inlet passage 26, so that only the slight excess capacity of the bleed passage is available to permit flow into the bonnet chamber 12. Thus, all the Tesla diodes may be arranged to operate during the closing movement of the main valve.

The flow resistance unit provides the desired resistance to flow without necessitating the use of extremely small passages. Thus, reducing materially the chances that the surge passage might clog.

Also by reason of the fact that the fluid moves back and forth through the surge passage, any foreign bodies which might accumulate and close the surge passage tend to be washed out. Thus, in some instances, a mere restriction may be provided in the urge passage in place of the flow resistance unit 22.

While the bleed passage 25 is shown as communicating with the point downstream from the main valve seat 6. In some instances, the bleed passage may simply bleed to the exterior of the valve.

I claim:
1. A pilot operated valve, comprising:
   (a) a main valve including an inlet, an outlet, a valve seat separating the inlet and outlet, a valve element for said valve seat, and a bonnet forming with said valve element a bonnet chamber dimensioned to effect closure of said main valve when pressurized and opening of said main valve when depressurized;
   (b) a pilot valve mounted on said main valve, and including a valve chamber, a valve seat in said valve chamber, a solenoid armature engageable with said valve seat, a bleed passage communicating between said pilot valve seat and a point downstream from the seat of said main valve, a supply passage communicating between said pilot valve chamber and a point upstream from said main valve seat, and a surge passage communicating between said pilot valve chamber and said bonnet chamber for pressurizing and depressurizing said bonnet chamber;
   (c) said flow passage having a series of Tesla diodes facing in at least one direction to provide greater resistance to flow in said direction than through said supply and bleed passages, thereby to effect slow movement of said main valve in at least one direction.

2. A pilot operated valve, as defined in claim 1, wherein:
   (a) said Tesla diodes face in opposite directions to produce a resistance to flow in either direction through said surge passage.
3. A pilot operated valve, as defined in claim 1, wherein:
   (a) said bleed passage is larger than said supply passage to provide excess flow capacity for fluid draining from said bonnet chamber, the excess flow capacity determining the rate at which said main valve opens.
4. A pilot valve for main valves having a main valve seat, a reciprocable member movable to and from said valve seat and carrying a valve element, and a valve bonnet chamber a wall of which is formed by said reciprocable member, said pilot valve comprising:
   (a) means defining a pilot valve chamber adjacent said bonnet chamber having a valve pilot seat therein;
   (b) a solenoid operated pilot valve element engageable with said pilot valve seat;
   (c) a supply passage for supplying fluid to said pilot valve chamber at a pressure corresponding to the pressure upstream from said main valve seat;
   (d) a bleed passage permitting escape of fluid from said pilot valve chamber;
   (e) one of said passages terminating at said pilot valve seat for closure by said pilot valve element;
   (f) and a surge passage communicating between said pilot valve chamber and said bonnet chamber for pressurizing and depressurizing said bonnet chamber thereby to open and close said main valve;
   (g) said surge passage having therein a tandem series of turbulence producing means creating a greater resistance to flow in one direction than in the reverse direction and creating a greater resistance to flow in at least one direction therethrough than said bleed and supply passages thereby to effect slow movement of said main valve in at least one direction.
5. A pilot valve, as defined in claim 4, wherein:
   (a) said turbulence producing means are a plurality of sets of Tesla diodes facing in opposite directions to produce a resistance to flow in either direction through said member.
6. A pilot valve, as defined in claim 4, wherein:
   (a) said turbulence producing means produce greater resistance in the direction to close said main valve;
   (b) and said bleed passage having a predetermined flow capacity in excess of the flow capacity of said supply passage, thereby to determine the opening rate of said main valve.

References Cited
UNITED STATES PATENTS

| | | | |
|---|---|---|---|
| 1,329,559 | 2/1920 | Tesla | 137—81.5 X |
| 2,664,916 | 1/1954 | Conley | 251—30 X |
| 3,346,004 | 10/1967 | Costello | 251—30 X |

FOREIGN PATENTS

| | | |
|---|---|---|
| 403,861 | 1/1934 | Great Britain. |

ARNOLD ROSENTHAL, *Primary Examiner.*

U.S. Cl. X.R.

251—45